May 19, 1970  D. T. WEST ET AL  3,512,348
REEL FOR FARM IMPLEMENTS
Filed April 28, 1967  3 Sheets-Sheet 2

INVENTORS
David T. West
William D. Long
David P. Fritz
BY Schmidt, Johnson, Hovey,
Williams & Bradley
ATTORNEYS INVENTORS
David T. West
William D. Long
David P. Fritz
BY Schmidt, Johnson, Hovey,
Williams & Bradley
ATTORNEYS

United States Patent Office 3,512,348
Patented May 19, 1970

3,512,348
REEL FOR FARM IMPLEMENTS
David T. West, William D. Long, and David P. Fritz, Newton, Kans., assignors to Hesston Corporation, Inc., Hesston, Kans., a corporation of Kansas
Filed Apr. 28, 1967, Ser. No. 634,630
Int. Cl. A01d 57/02
U.S. Cl. 56—226       8 Claims

ABSTRACT OF THE DISCLOSURE

A harvesting implement having an elongated crop-cutting sickle traversing the normal path of travel of the implement adjacent the ground. The implement is provided with a reel disposed above the sickle and having a plurality of rows of fingers which are extendible for sweeping the growing crop into the sickle during advancement of the implement and retractable to permit removal of the fingers from the crop after the cut crop is carried away from the sickle. The reel is provided with a plurality of elongated members disposed alternately between rows of fingers for contacting the growing crop and leaning the same forwardly of the path of travel of the implement so that, upon cutting of the crop, the same is carried by fingers of the reel rearwardly of the sickle with the cut ends leading.

The reel is provided with a fixed shaft in parallelism with and spaced from the axis of rotation of the reel which rotatably mounts a master control element for oscillating, and thereby extending and retracting the fingers, the latter being carried in side-by-side relationship on a shaft extending longitudinally of the reel and being rotatable thereon. A number of links are provided for pivotally interconnecting the master control and crank tabs which extend laterally from and are rigid with the finger supports. Thus, upon rotation of the reel about the eccentric shaft, the finger supports are oscillated to extend and retract the fingers.

This invention relates to farm machinery and, more particularly to harvesting implements.

The crop lean bars of conventional harvesting implements are generally spaced so far from the fingered reels, the sickles and the ground that uniform cutting of the crop is not always possible, particularly when the crop is relatively short. Furthermore, the mechanism for extending and retracting the fingers of the reel has been vulnerable to accumulation of crop particles and other foreign materials requiring frequent cleaning.

It is, therefore, the primary object of the instant invention to provide a harvesting implement operable to cause proper leaning of the crop prior to cutting of the same whereby the crop is cut uniformly and wherein the finger-oscillating mechanism is protected from accumulation of foreign material to the end that cleaning problems are substantially alleviated.

A very important object of the present invention is to provide crop-leaning structure for such an implement wherein the crop is continually leaned forwardly of the implement until the crop is cut so that upon cutting, the crop is received by the implement with the cut ends leading.

Another very important aim of the invention is to dispose the finger-oscillation mechanism internally of the reel whereby the mechanism is protected and furthermore, because of its centralized location, the mechanism is rendered more compact and sturdy.

It is a further important object of the invention to provide an improved reel for such an implement wherein portions of the reel itself are strategically located for contacting and leaning the crop during rotation of the reel whereby the crop is contacted and leaned forwardly of the implement until the instant the crop is cut by the sickle.

One of the major purposes of the invention is the provision of an improved fingers reel for use with harvesting implements such as disclosed, for example, in U.S. Letters Patent No. 3,224,177, entitled "Method of Cutting, Conditioning and Windrowing a Crop," issued Dec. 21, 1965; and No. 3,241,300, entitled "Windrower-Conditioner," issued Mar. 22, 1966, both of which are assigned to the assignee of the instant invention, whereby the implements are rendered more efficient and maintenance free.

In the drawings:

FIG. 11 is a fregmentary, top plan view of a modified form of reel; and

FIG. 12 is an end view similar to FIG. 3 showing the reel of FIG. 11.

Figure 1:
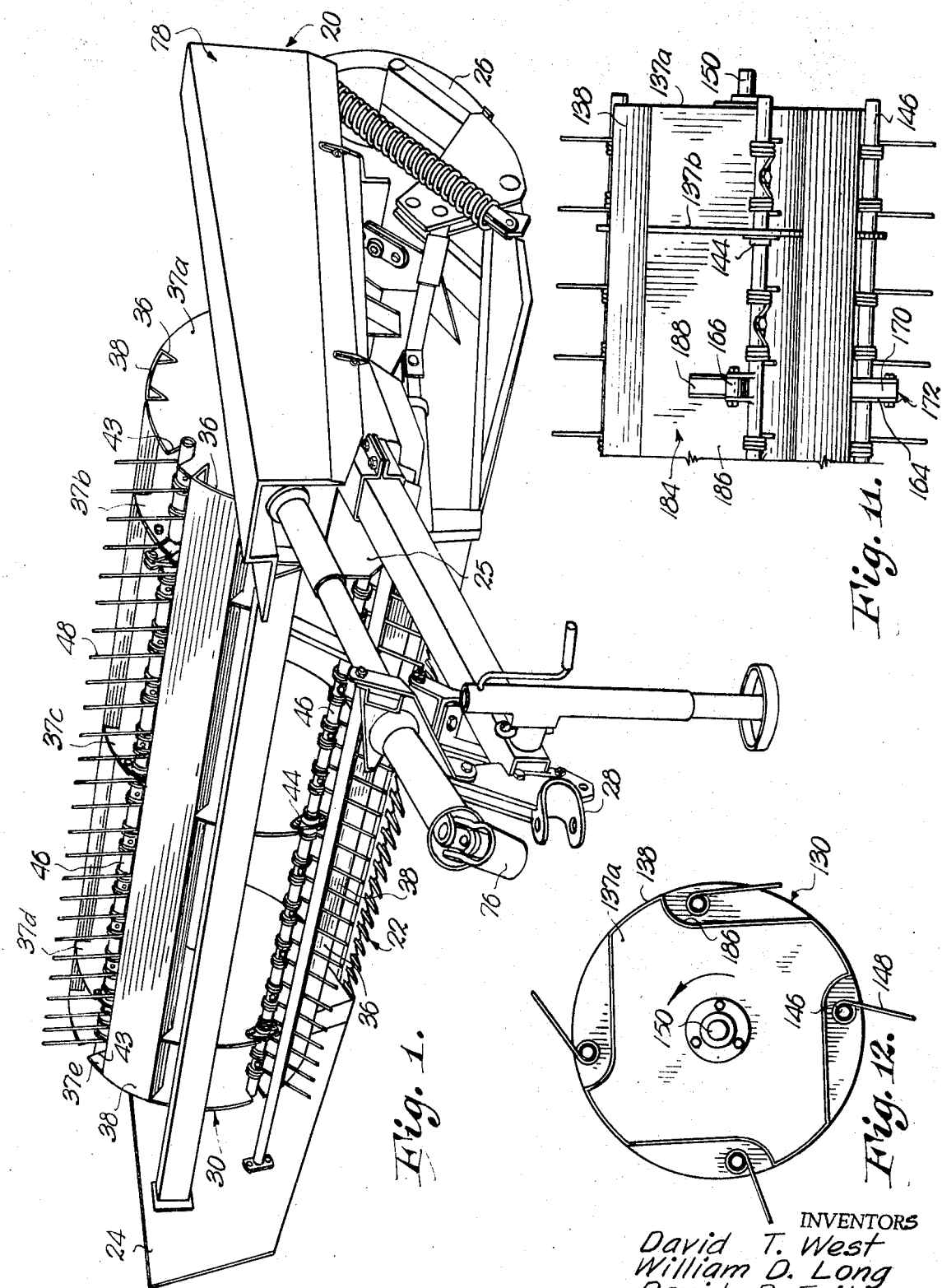
FIG. 1 is a perspective view of a farm implement having a cropcutting sickle and a reel embodying the principles and concepts of the instant invention.
Figure 2:
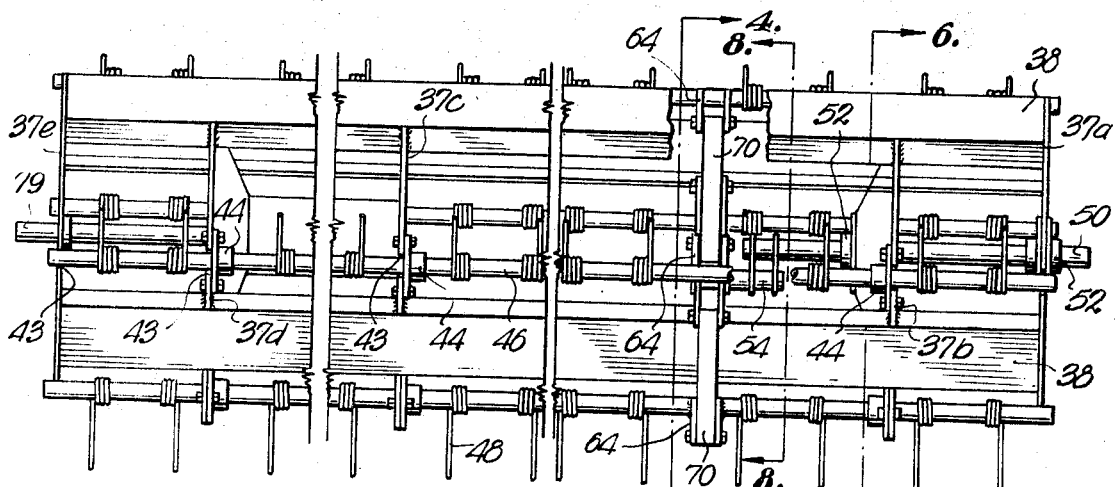
FIG. 2 is a top plan view of the reel.

A farm implement embodying the concepts and principles of the instant invention is broadly designated by the numeral 20. Implement 20 is provided with a crop-cutting sickle 22 which extends between spaced sidewalls 24 and 25 of the implement 20. A plurality of wheels such as 26 guide harvester 20 along a path of travel over a growing crop when the harvester 20 is attached to a tractor or the like (not shown) through the medium of hitch 28, and it is to be understood that sickle 22 traverses the path of travel of implement 20 adjacent the ground as implement 20 is advanced therealong.

An elongated fingered reel 30 is rotatably carried between walls 24 and 25 for rotation about its longitudinal axis and in parallelism with sickle 20 about the latter. Viewing FIG. 7, it can be seen that reel 30 extends along sickle 20 and projects rearwardly and forwardly thereof, the direction of advancement of implement 20 being shown by the arrow 32 while the growing crop is designated by the numeral 34.

Figure 3:
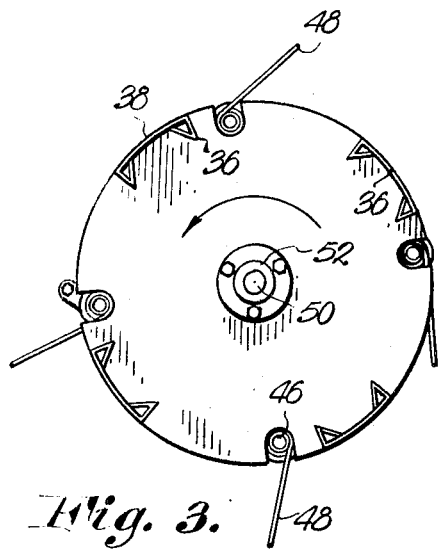
FIG. 3 is an end view of the reel.

A plurality of elongated members 36 extend longitudinally of reel 30, are spaced apart circumferentially thereof and are spaced radially outwardly of the longitudinal axis of reel 30. Each member 36 has a convex, transversely elongated, outer surface 38, the surfaces 38 being concentric with the longitudinal axis of reel 30 and are spaced equidistant from the latter by virtue of members 36 being mounted on the peripheries of a plurality of longitudinally spaced, generally circular spacer plates 37a, b, c, d and e, plates 37a and e being disposed at opposite ends of reel 30 while plate 37c is disposed approximately centrally thereof. Viewing FIG. 3, it can be seen that the circumferential distance between proximal members 36 is approximately twice the transverse length of the members 36. Each plate 37a–e is provided with a plurality of circumferentially spaced slots 43, each slot 43 being disposed in longitudinally alignment with a slot 43 of each of the other plates 37a–e. A bearing assembly 44 is mounted in alignment with each slot 43 of plates 37b, c and d. The assemblies 44 rotatably support a number of finger support shafts 46 for rotation about axes parallel to the axis of rotation of reel 30. Shafts 46 are spaced circumferentially of reel 30 between members 36 and each carries a longitudinally extending row of side-by-side fingers 48. Thus, upon rotation of shafts 46 in assemblies 44, the fingers 48 are oscillated between retracted and extended positions.

A fixed shaft 50 extends inwardly from wall 25 and is journalled through bearing structures 52 located on plates 37a and 37b at the axis of rotation of reel 30, whereby the latter is freely rotatable with respect to shaft 50. A stub shaft 54 is disposed in spaced parallelism with respect to shaft 50, is rigidly connected thereto by a laterally extending bracket 56, and is held against rotation thereby. Stub shaft 54 rotatably mounts a generally triangular-shaped master control 58, the latter comprising a pair of parallel plates 60 having a spacer 62 disposed therebetween.

Each support shaft 46 is provided with laterally extending radial crank means 64 rigid therewith. A coupling 66 is received between plates 60 at the apex 58a of control 58 and is rigidly connected thereto by spaced nut and bolt means 68. The coupling 66 is pivotally connected to the crank means 64a of one of the supports shafts 46a, as can best be seen viewing FIGS. 4, 5 and 8. Mechanisms in the nature of links 70 connect each of the other cranks 64 with control 58, one end of each link 70 being pivotally mounted between plates 60, while the opposite end of each link is pivotally connected to a respective crank 64. Shaft 54, control 58, coupling 66, links 70, and cranks 64 present apparatus 72 which is responsive to the rotation of reel 30 for oscillating support shafts 46.

Implement 20 is provided with a pair of conditioner rolls 74 disposed above and behind sickle 22. Conditioner rolls 74 may be similar to the conditioner rolls disclosed and described in each of the above-referenced patents and it is to be noted that a ramp 75 is provided between sickle 20 and conditioner rolls 74 for guiding cut crops into the latter. A power takeoff assembly 76 adapted for coupling to a tractor (not shown) for pulling implement 20 is connected to sickle 22, reel 30, and conditioner rolls 74 through power transmission mechanism broadly designated by the numeral 78 and thus, reel 30 and rolls 74 are rotated in the directions indicated by the arrows in FIG. 7 and sickle 22 is actuated for cutting the crop 34 as the implement 20 is moved in the direction indicated by arrow 32. In this connection, reel 30 is provided with a drive shaft 79 disposed oppositely from shaft 50 and rigid with plates 37c, d and e at the axis of rotation of reel 30. Shaft 79 is coupled with mechanism 78 for rotation thereby.

Figure 4:
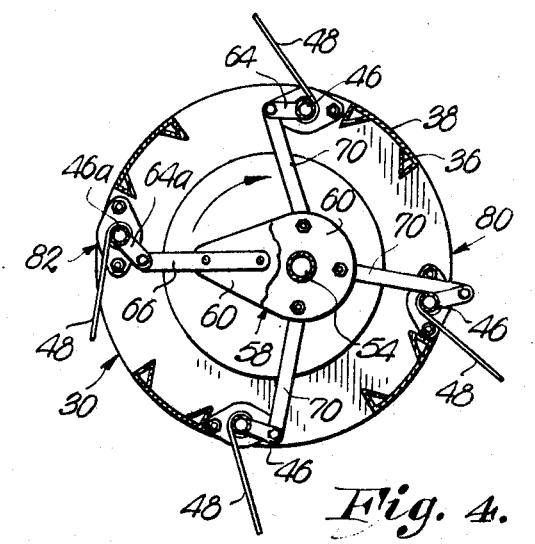
FIG. 4 is a cross-sectional view taken substantially along line 4—4 of FIG. 2.
Figure 5:
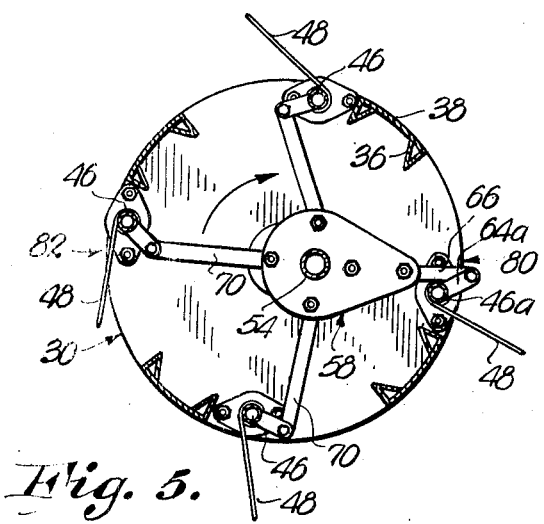
FIG. 5 is a cross-sectional view similar to FIG. 4 with the reel having been rotated approximately 180°.
Figure 6:
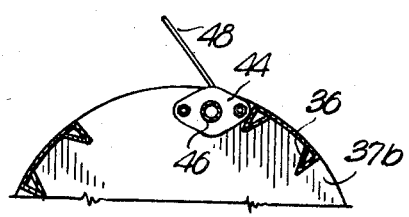
FIG. 6 is a fragmentary, cross-sectional view taken substantially along line 6—6 of FIG. 2.
Figure 8:
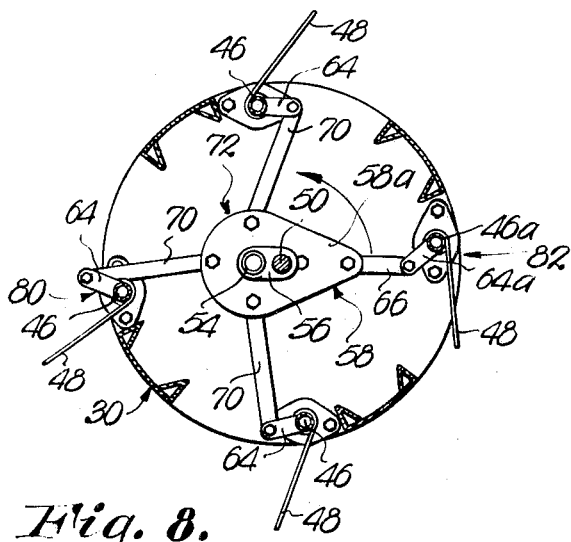
FIG. 8 is a cross-sectional view taken along line 8—8 of FIG. 2.
Figure 10:
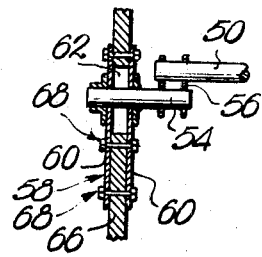
FIG. 10 is a cross-sectional view taken along line 10—10 of FIG. 9.
Figure 9:
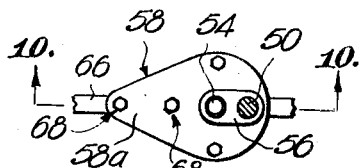
FIG. 9 is a fregmentary view illustrating the master control element of FIG. 8 but rotated 180°.

The operation of apparatus 72 is best illustrated with reference to FIGS. 4, 5 and 8. Coupling 66 is rigid with control 58 and thus, as reel 30 is rotated about shaft 50, control 58 will be rotated about the eccentric axis of stub shaft 54. Stub shaft 54, of course, is fixed against rotation by its rigid connection to shaft 50 and, therefore, reel 30 will rotate relative to shaft 54. During such rotation, one zone 80 of the periphery of reel 30 will always be closer to shaft 54 than any other zone of the periphery of reel 30 because bracket 56 extends from shaft 50 toward zone 80 and therefore the axis of stub shaft 54 is disposed between zone 80 and the axis of rotation of reel 30. Hence, as reel 30 rotates during the advancement of implement 20, the distance between each shaft 46, 46a and the control 58 decreases as the support shafts 46, 46a progressively approach zone 80 and therefore, since control 58 and coupling 66 are rigid, the support shafts 46, 46a moving through zone 80 will be rotated in a direction to extend the fingers 48 thereon. On the other hand, as the shafts 46, 46a are progressively rotated through a zone 82 disposed oppositely of zone 80 on the periphery of reel 30 where the distance between the support shafts 46, 46a and control 58 is maximized, fingers 48 will be retracted.

Figure 7:
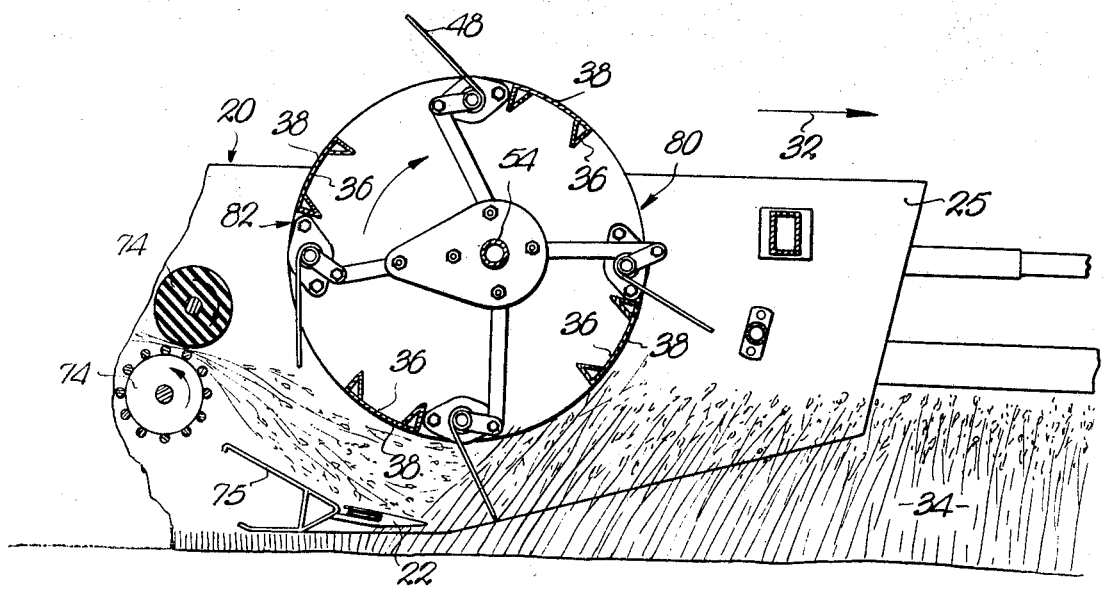
FIG. 7 is a fregmentary, vertical cross-sectional view of the implement.

Viewing FIG. 7, it can be seen that members 36 present structures for leaning the crop 34 forwardly during advancement of implement 20. Furthermore, it has been found that as the forwardly leaned crop is cut by sickle 22, the forwardly leaned cut crop will also exert a force on the crop ahead of the sickle to cause the same to lean forwardly and this action complements the action of members 36. It can be seen that when the crop 34 is leaned forwardly prior to cutting, the same will fall with its cut ends disposed toward ramp 75 and rolls 74 and, therefore, upon continued advancement of implement 20, the cut crop is swept toward conditioner rolls 74 with the cut ends leading by fingers 48 which are in a generally extended condition at the time the same are rotated past the sickle. In this respect it is to be noted that stub shaft 54 is preferably disposed forwardly of the axis of rotation of reel 30 so that zone 80 is at the forwardmost location on reel 30 and zone 82 is at the rearwardmost location thereon. An adjustable bracket may be provided for releasably connecting shaft 50 to sidewall 24 so that the disposition of stub shaft 54 may selectively be altered to move zone 80 relative to the axis of rotation of reel 30. After sweeping the cut crop toward the conditioner rolls 74, fingers 48 and the shafts 46, 46a therefor approach zone 82 and the fingers 48 are retracted to permit withdrawal of the same from the cut crop which is now moving along ramp 75 and through the conditioner rolls 74.

It can be seen that because of thet strategic location of members 36, even very short crops will be contacted and leaned forwardly thereby prior to cutting of the crop by sickle 22, and it has been found that a more uniform cut is produced and further, that a very evenly distributed row of cut crop will be deposited on the ground behind the harvester implement 20.

The structure of apparatus 72 is compact and has been found to be sturdier, as well as more economical to produce, than the mechanisms utilized for finger oscillation in the past. Additionally, the centralized location of apparatus 72 within reel 30, as well as the manner in which the same operates, has rendered the apparatus substantially immune to the effects caused by the accumulation of crop particles and other such foreign materials. The amount of pivoting required between links 70 and control 58 is minimized and there is no location in apparatus 72 where dirt can accumulate sufficiently to substantially impede the operation thereof.

Turning now to FIGS. 11 and 12, another form of reel is broadly designated by the numeral 130. The fingers 148, shafts 146 and 150, crank means 164, links 170, and the remaining components of apparatus 172 (not shown) are substantially identical with coresponding components of reel 30. The end spacer plates 137a and e of reel 130 have a genetrally cross-shaped configuration as best illustrated in FIG. 12, it being understood that plate 137e is not shown in the drawings. Plates 137b, c and d are substantially identical to their counterparts in reel 30, it being understood that plates 137c and d are also not shown in the drawings. A continuous skin 184 is wrapped around spacers 137a–e to present surfaces 138 on the outer periphery of reel 130 and longitudinally extending valleys 186 disposed between surfaces 138. Openings 188 in skin 184 receive links 170 (or coupling 166 which is identical to coupling 66 of reel 30) therethrough. Plates 137b, c and d extend outwardly beyond skin 184 at valleys 186 and shafts 146 are rotatably carried by bearing assemblies 144 mounted on plates 137b, c and d. Manifestly, the continuous skin 184 provides even further protection for the finger-oscillating apparatus 172.

Having thus described the invetnion, what is claimed as new and desired to be secured by Letters Patent is:

1. For use with a farm implement having an elongated, rotatable, fingered reel provided with a plurality of longitudinally extending, parallel finger supports carrying respective rows of laterally extending fingers and mounted for oscillation on the reel about axes parallel to the axis of rotation of the reel, apparatus operably coupled with the supports and responsive to rotation of the reel for oscillating the supports to extend and retract corresponding rows of fingers in timed sequence, said apparatus comprising:
   a shaft in spaced parallelism to said axis of the reel;
   means supporting and holding said shaft against rotation;
   a master control rotatable on the shaft;
   a coupling operably interconnecting said control and one of said finger supports for oscillating the latter in response to rotation of the reel; and
   mechanism operably connecting each of the remaining finger supports respectively with said control for oscillating said remaining finger supports in response to rotation of the reel.

2. The invention of claim 1,
   each finger support having a radial crank rigid thereto,
   said mechanisms comprising links each pivotally connected with the control and with corresponding cranks,
   said coupling comprising means pivotally connecting the control with the crank of said one finger support.

3. In a farm implement, the combination with an elongated crop cutting sickle traversing the normal path of travel of the implement adjacent the ground of a rotatable, fingered reel for sweeping the growing crop into the sickle during advancement of the implement and structure on the reel for leaning the growing crop forwardly ahead of the sickle, said structure comprising:
   a plurality of elongated members parallel with the sickle and with the axis of rotation of the reel,
   said members extending longitudinally of the reel, being circumferentially spaced around said axis and being mounted on the reel for rotation therewith,
   said reel being disposed above, rearwardly and forwardly of the sickle to position the members for engagement with the growing crop during said advancement to maintain the latter in the forwardly leaned condition until severed by the sickle whereby the fingers of the reel carry the cut crop rearwardly of the sickle with the cut ends leading,
   there being a plurality of rows of said fingers extending longitudinally of the reels, with the rows circumferentially spaced and alternating with the members.

4. The invention of claim 3, each row having a finger support extending longitudinally of the reel, inwardly of the members with the fingers extending outwardly beyond the members.

5. The invention of claim 4,
   said members being provided with transversely elongated, outermost surfaces,
   said surfaces being convex, concentric with said axis and equidistant from the latter.

6. The invention of claim 5, the distance between the members circumferentially of the reel being approximately twice the transverse length of the members.

7. The invention of claim 4,
   each support being carried by the reel for oscillation about an axis parallel to said axis of the reel; and
   apparatus operably coupled with the supports and responsive to rotation of the reel for oscillating the supports whereby to extend the fingers during the sweeping action thereof and retract the same after the cut crop is carried away from the sickle.

8. The invention of claim 7, wherein said apparatus comprises,
   a shaft in spaced parallelism to said axis of the reel;
   means supporting and holding said shaft against rotation;
   a master control rotatable on the shaft;
   a coupling operably interconnecting said control and one of said finger supports for oscillating the latter in response to rotation of the reel; and
   mechanism operably connecting each of the remaining finger supports respectively with said control for oscillating said remaining finger supports in response to rotation of the reel.

References Cited
UNITED STATES PATENTS

| | | | |
|---|---|---|---|
| 2,508,401 | 5/1950 | Kirk | 56—130 |
| 2,780,905 | 2/1957 | Darlington | 56—330 |
| 3,224,177 | 12/1965 | Adee | 56—23 |
| 3,241,300 | 3/1966 | Fell et al. | 56—23 |
| 3,375,643 | 4/1968 | McCarty et al. | 56—23 |

RUSSELL R. KINSEY, Primary Examiner